(12) United States Patent
Charlet et al.

(10) Patent No.: US 8,832,081 B2
(45) Date of Patent: *Sep. 9, 2014

(54) STRUCTURED LARGE OBJECT (LOB) DATA

(75) Inventors: Kyle J. Charlet, Morgan Hill, CA (US); Nathan D. Church, San Jose, CA (US); Kevin D. Hite, San Jose, CA (US); Christopher M. Holtz, San Jose, CA (US); Richard V. Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,698

(22) Filed: Apr. 11, 2012

(65) Prior Publication Data

US 2013/0246395 A1    Sep. 19, 2013

Related U.S. Application Data

(63) Continuation of application No. 13/418,771, filed on Mar. 13, 2012.

(51) Int. Cl.
*G06F 7/00*      (2006.01)
*G06F 17/30*    (2006.01)

(52) U.S. Cl.
USPC ........................................................ 707/722

(58) Field of Classification Search
USPC ......... 707/609, 611, 627, 705, 729, 732, 758, 707/763, 781, 801
See application file for complete search history.

(56) References Cited

U.S. PATENT DOCUMENTS 5,732,402 A    3/1998    Lehman
6,061,678 A    5/2000    Klein et al.
(Continued)

FOREIGN PATENT DOCUMENTS

CN    1723462 A       1/2006
EP    0991005 A2      4/2000
JP    2010282304 A    12/2010

OTHER PUBLICATIONS

Allen, G., B. Bryla, and D. Kuhn, "Working with XML Data", Oracle SQL Recipes, 2009, Part 4, 335-350, DOI: 10.10071978-1-4302-2510-2_14, Total 17 pp.

(Continued)

*Primary Examiner* — Robert Beausoliel, Jr.
*Assistant Examiner* — Nicholas Allen
(74) *Attorney, Agent, or Firm* — Janaki K. Davda; Konrad, Raynes, Davda & Victor LLP

(57) ABSTRACT

Provided are techniques for processing structured content within Large Object (LOB) data that is stored in a column of a database table. Structural metadata describing structures that each define a different format of the structured content is stored. A request for data in the database table is received. The structural metadata is used to create an empty result set with columns defined by at least two of the structures. For each row of data in the database table that includes LOB data, control data is used to identify one of the structures to be applied to the structured content within the LOB data stored in that row of data, and the structured content within the LOB data in that row of data is mapped to the columns in the result set based on the identified one of the structures. The result set is returned.

9 Claims, 19 Drawing Sheets

(56) References Cited

U.S. PATENT DOCUMENTS

| | | | |
|---|---|---|---|
| 7,096,224 B2* | 8/2006 | Murthy et al. | 707/763 |
| 7,437,346 B2 | 10/2008 | Ashwin et al. | |
| 7,853,619 B2 | 12/2010 | Yu et al. | |
| 2003/0225798 A1 | 12/2003 | Norcott | |
| 2004/0148272 A1 | 7/2004 | Raman et al. | |
| 2004/0167879 A1 | 8/2004 | Cotner et al. | |
| 2004/0199867 A1* | 10/2004 | Brandenborg | 715/500.1 |
| 2004/0236767 A1* | 11/2004 | Soylemez et al. | 707/100 |
| 2005/0050074 A1 | 3/2005 | Jain et al. | |
| 2005/0223022 A1 | 10/2005 | Weissman et al. | |
| 2005/0228828 A1 | 10/2005 | Chandrasekar et al. | |
| 2006/0101041 A1 | 5/2006 | Agarwal et al. | |
| 2006/0136516 A1 | 6/2006 | Jain et al. | |
| 2006/0195460 A1* | 8/2006 | Nori et al. | 707/100 |
| 2007/0118540 A1* | 5/2007 | Guo | 707/100 |
| 2008/0065675 A1* | 3/2008 | Bozich et al. | 707/102 |
| 2008/0071844 A1* | 3/2008 | Gopal et al. | 707/204 |
| 2008/0195668 A1* | 8/2008 | Chandrasekar et al. | 707/104.1 |
| 2008/0208855 A1* | 8/2008 | Lingenfelder et al. | 707/6 |
| 2008/0243945 A1* | 10/2008 | Hanus et al. | 707/202 |
| 2008/0281842 A1 | 11/2008 | Nguyen et al. | |
| 2009/0024578 A1* | 1/2009 | Wang et al. | 707/3 |
| 2009/0037499 A1* | 2/2009 | Muthulingam et al. | 707/205 |
| 2009/0193006 A1* | 7/2009 | Herrnstadt | 707/5 |
| 2010/0169354 A1* | 7/2010 | Baby et al. | 707/765 |
| 2010/0179940 A1* | 7/2010 | Gilder et al. | 707/622 |
| 2010/0205227 A1* | 8/2010 | Weissman et al. | 707/803 |
| 2011/0125756 A1* | 5/2011 | Spence et al. | 707/740 |
| 2011/0161375 A1* | 6/2011 | Tedder et al. | 707/803 |
| 2011/0225107 A1* | 9/2011 | Khosravy | 706/12 |
| 2012/0030240 A1* | 2/2012 | Engelhardt et al. | 707/778 |

OTHER PUBLICATIONS

English Abstract and Machine Translation for JP2010282304A, published Dec. 16, 2010, Total 30 pp.

"Identifying Null SQL Values with Null Indicator Variables", [online], [Retrieved on Feb. 6, 2012]. Retrieved from the Internet at <URL: http://publib.boulder.ibm.com/infocenter/db2luw/v9/topic/com.ibm.db2.udb.apdv.e . . . >, Total 3 pp.

U.S. Appl. No. 13/418,771, filed Mar. 13, 2012, entitled "Structured Large Object (LOB) Data", invented by Charlet, K.J., N. D. Church, K.D. Hite, C.M. Holtz, and R.V. Iran, Total 49 pp. [57.256 (Appln)].

Amendment 1, Apr. 1, 2013, for U.S. Appl. No. 13/418,771, filed Mar. 13, 2012 by K.J. Charlet et al., Total 11 pp. [57.256 (Amend1)].

Office Action 1, Jan. 17, 2013, for U.S. Appl. No. 13/418,771, filed Mar. 13, 2012 by K.J. Charlet et al., Total 20 pp. [57.256 (OA1)].

US Patent No. 7,437,346, dated Oct. 14, 2008, is an English language equivalent of CN1723462, dated Jan. 18, 2006.

Final Office Action 1 for U.S. Appl. No. 13/418,771, dated Jun. 13, 2013, 29 pp. [57.256 (FOA)].

International Search Report & Written Opinion for International Application No. PCT/IB2013/051055, dated Jul. 4, 2013, 9 pp. [57.256PCT (ISR & WO)].

Response to Final OA1 for U.S. Appl. No. 13/418,771, dated Sep. 20, 2013, 11 pp. [57.256 (RFOA1)].

Notice of Allowance, dated Oct. 25, 2013, for U.S. Appl. No. 13/418,771, filed Mar. 13, 2012, 15 pp. [57.256 (NOA1)].

* cited by examiner

| Policy Type | Property Type | Number of Rooms | Home Value | Address | Make | Model | Year | Color | Value |
|---|---|---|---|---|---|---|---|---|---|
| M | | | | | Fort | T | 1956 | Black | 15000.00 |
| H | Single Family | 7 | 500,000.00 | 555 Disk Drive, San Jose, CA 95141 | | | | | |

```
SEGM
NAME=INSURPOL,EXTERNALNAME=INSURANCEPOLICY,ENCODING=Cp1047,BYTES
=50,RULES=(LLL,FIRST)
    FIELD
    NAME=POLTYPE,EXTERNALNAME=PolicyType,BYTES=1,START=1,DATATYPE=CH
AR
    DFSMAP NAME=PolicyData,DEPENDINGON=PolicyType
        DFSCASE
        NAME=HOUSE,MAPNAME=PolicyData,CASEIDTYPE=C,CASEID=H
            FIELD
            NAME=PROPTYPE,EXTERNALNAME=PropertyType,BYTES=15,START=2,DATATYP
E=CHAR,CASENAME=HOUSE
            FIELD
            NAME=NUMROOMS,EXTERNALNAME=NumberOfRooms,BYTES=2,START=17,DATATY
PE=SHORT,CASENAME=HOUSE
            FIELD
            NAME=HOMEVAL,EXTERNALNAME=HomeValue,BYTES=4,START=19,DATATYPE=IN
TEGER,CASENAME=HOUSE
            FIELD
            NAME=ADDRESS,EXTERNALNAME=ADDRESS,BYTES=20,START=23,DATATYPE=CHA
R,CASENAME=HOUSE
        DFSCASE
        NAME=MOTOR,MAPNAME=PolicyData,CASEIDTYPE=C,CASEID=M
            FIELD
            NAME=MAKE,BYTES=15,START=2,DATATYPE=CHAR,CASENAME=MOTOR
            FIELD
            NAME=MODEL,BYTES=15,START=17,DATATYPE=CHAR,CASENAME=MOTOR
            FIELD
            NAME=YEAR,BYTES=2,START=32,DATATYPE=SHORT,CASENAME=MOTOR
            FIELD
            NAME=COLOR,BYTES=8,START=34,DATATYPE=CHAR,CASENAME=MOTOR
            FIELD
            NAME=VALUE,BYTES=4,START=42,DATATYPE=INTEGER,CASENAME=MOTOR
```

FIG. 9

```
........
<segment imsName="INSURPOL" name="INSURANCEPOLICY">
    <field imsDatatype="C" startPos="1" bytes="1"
imsName="POLTYPE" name="PolicyType">
        <marshaller encoding="CP1047">
            <typeConverter>CHAR</typeConverter>
        </marshaller>
        <applicationDatatype datatype="CHAR"/>
    </field>
    <mapping dependingOnField="PolicyType">
        <case name="HOUSE">
            <dependingOnFieldValue valueDatatype="C" value="H"/>
            <field imsDatatype="C" startPos="2" bytes="15"
imsname="PROPTYPE" name="PropertyType">
                <marshaller encoding="CP1047">
                    <typeConverter>CHAR</typeConverter>
                </marshaller>
                <applicationDatatype datatype="CHAR"/>
            </field>
            <field imsDatatype="X" startPos="17" bytes="2"
imsname="NUMROOMS" name="NumberOfRooms">
                <marshaller>
                    <typeConverter>SHORT</typeConverter>
                </marshaller>
                <applicationDatatype datatype="SHORT"/>
            </field>
            <field imsDatatype="C" startPos="19" bytes="4"
imsname="HOMEVAL" name="HomeValue">
                <marshaller>
                    <typeConverter>INTEGER</typeConverter>
                </marshaller>
                <applicationDatatype datatype="INTEGER"/>
            </field>
            <field imsDatatype="C" startPos="23" bytes="20"
imsname="ADDRESS" name="ADDRESS">
                <marshaller encoding="CP1047">
                    <typeConverter>CHAR</typeConverter>
                </marshaller>
                <applicationDatatype datatype="CHAR"/>
            </field>
```

FIG. 10A

```
</case>
<case name="MOTOR">
  <dependingOnFieldValue valueDatatype="C" value="M"/>
  <field imsDatatype="C" startPos="2" bytes="15" imsname="MAKE" name="MAKE">
    <marshaller encoding="CP1047">
      <typeConverter>CHAR</typeConverter>
    </marshaller>
    <applicationDatatype datatype="CHAR"/>
  </field>
  <field imsDatatype="C" startPos="17" bytes="15" imsname="MODEL" name="MODEL">
    <marshaller encoding="CP1047">
      <typeConverter>CHAR</typeConverter>
    </marshaller>
    <applicationDatatype datatype="CHAR"/>
  </field>
  <field imsDatatype="C" startPos="32" bytes="2" imsname="YEAR" name="YEAR">
    <marshaller>
      <typeConverter>SHORT</typeConverter>
    </marshaller>
    <applicationDatatype datatype="SHORT"/>
  </field>
  <field imsDatatype="C" startPos="34" bytes="8" imsname="COLOR" name="COLOR">
    <marshaller encoding="CP1047">
      <typeConverter>CHAR</typeConverter>
    </marshaller>
    <applicationDatatype datatype="CHAR"/>
  </field>
  <field imsDatatype="C" startPos="42" bytes="4" imsname="VALUE" name="VALUE">
    <marshaller>
      <typeConverter>INTEGER</typeConverter>
    </marshaller>
    <applicationDatatype datatype="INTEGER"/>
  </field>
</case>  </mapping>
  </segment>
........
```

FIG. 10B

```
DBD      NAME=SAMPLE,                                                    C
         ACCESS=(PHDAM,OSAM),                                            C
         RMNAME=(DFSHDC20,3,3,25),                                       C
         PASSWD=NO
***********************************************************************
***           SEGMENT NUMBER 1                                        ***
***********************************************************************
SEGM     NAME=PERSONAL_INFO,                                             C
         PARENT=0,                                                       C
         BYTES=(112,82),                                                 C
         TYPE=DIR,                                                       C
         RULES=(LLL,HERE)
FIELD    NAME=(NAME,SEQ,U),                                              C
         START=3,                                                        C
         BYTES=30,                                                       C
         TYPE=C
FIELD    NAME=(ADDRESS),                                                 C
         START=33,                                                       C
         BYTES=50,                                                       C
         TYPE=C
FIELD    NAME=(EMAIL),                                                   C
         START=83,                                                       C
         BYTES=30,                                                       C
         TYPE=C
FIELD    NAME=(LENGTH),                                                  C
         START=1,                                                        C
         BYTES=2,                                                        C
         TYPE=X
```

STRUCTURED LARGE OBJECT (LOB) DATA

CROSS-REFERENCE TO RELATED APPLICATIONS

This application is a continuation of and claims the benefit of U.S. patent application Ser. No. 13/418,771, filed Mar. 13, 2012, which application is incorporated herein by reference in its entirety.

FIELD

Embodiments of the invention relate to creating, searching for, retrieving, and nulling structured LOB data.

BACKGROUND

Database Management System (DBMS) software may use a database query language to store and retrieve data in a database. The database query language that may be, but is not limited to, a Structured Query Language (SQL) interface. A database is organized into tables that consist of rows and columns of data. The rows may be called tuples or records or rows.

A table in a database can be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". An index is based on one or more columns of the table.

A query may be described as a request for information from a database based on specific conditions. A query typically includes one or more predicates. A predicate may be described as an element of a search condition that expresses or implies a comparison operation (e.g., A=3).

Large object (LOB) data may be described as a collection of binary data stored in a single column or field in a table in a DBMS.

In DBMS and database Application Programming Interfaces (APIs), the interpretation of Large Object (LOB) data columns is left to a database application after retrieving the LOB data. Database applications retrieve raw LOB data from the database and use application logic to post process the LOB data.

Often, LOB data contains multimedia, audio, or image data, which is unstructured. Sometimes, however, the LOB data can also contain structured content (i.e., in the form of fields). For example, the structured content may include tags for fields, such as 'artist' and 'title' fields, embedded within the multimedia LOB data. In order to search for specific fields in the LOB data, the DBMS materializes the LOB data and sends the LOB data back to the requesting application. The requesting application programmatically inspects the contents of the LOB data looking for the specific value of a specific field. Some DBMSs may allow searching on a subset of the LOB data, but they first internally materialize the LOB data in order to accomplish this. Materializing the LOB data may be described as loading the LOB data into memory through an Input/Output (I/O) operation.

A Variable length LOB (VLOB) is a type of LOB and may be defined as having a certain number of fields, but, different records (i.e., instances) of the VLOB may have different fields that are valid or null (i.e., invalid). Thus, the VLOB may be described as having a varying number of valid fields.

SUMMARY

Provided are a computer implemented method, computer program product, and system for processing structured content within Large Object (LOB) data that is stored in a column of a database table. Structural metadata describing structures that each define a different format of the structured content is stored. A request for data in the database table is received. The structural metadata is used to create an empty result set with columns defined by at least two of the structures. For each row of data in the database table that includes LOB data, control data is used to identify one of the structures to be applied to the structured content within the LOB data stored in that row of data, and the structured content within the LOB data in that row of data is mapped to the columns in the result set based on the identified one of the structures. The result set is returned.

BRIEF DESCRIPTION OF THE SEVERAL VIEWS OF THE DRAWINGS

In the drawings, like reference numbers represent corresponding parts throughout.

FIG. 7 illustrates, in a block diagram, an insurance policy result set having a format based on formats of underlying LOB data in accordance with certain embodiments.

FIG. 9 illustrates pseudocode describing an insurance policy table in accordance with certain embodiments.

FIGS. 10A and 10B illustrates an example of structural metadata for pseudocode describing an insurance policy table in accordance with certain embodiments.

FIG. 19 illustrates a definition of a VLOB in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
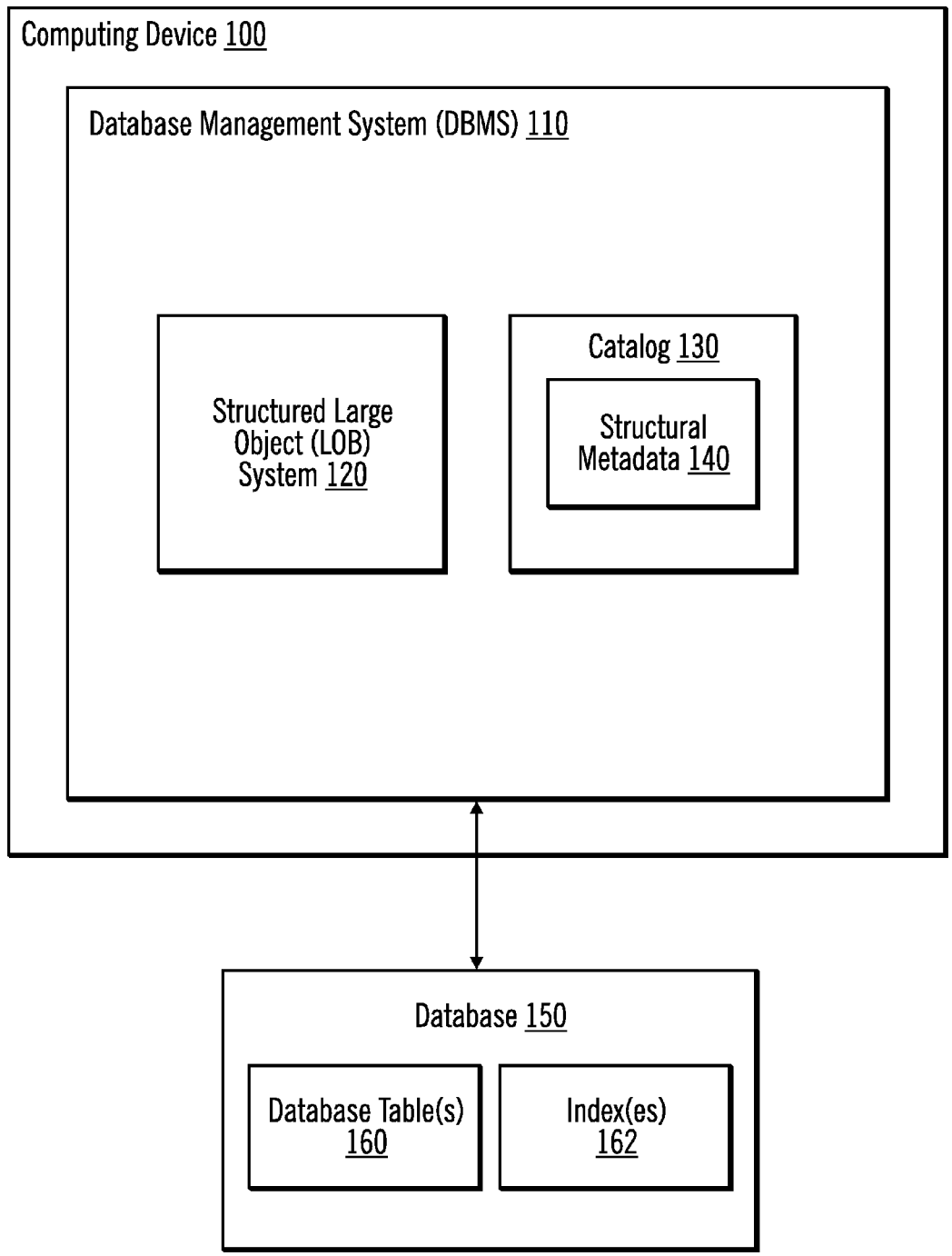
FIG. 1 illustrates, in a block diagram, a computing environment in accordance with certain embodiments.

FIG. 1 illustrates, in a block diagram, a computing environment in accordance with certain embodiments. The computing device includes DBMS 110, and the DBMS 110 includes a structured LOB system 120 and a catalog 130. The catalog 130 includes structural metadata 140. In certain embodiments, the structural metadata 140 includes offsets and lengths of structured content (e.g., fields) in the LOB data, as well as, mapping information for use in accessing the LOB data. The DBMS 110 is coupled to a database 150. The database 150 stores one or more database tables 160 and one or more indexes 162. The one or more database tables 160 may store LOB data, Binary Large Object (BLOB) data, VLOB data, and other data.

Creating Structured LOB Data

The structured LOB system 120 provides dynamic runtime mapping of binary data with applied structured content in, for example, a Database Management System (DBMS), to generate structured LOB data.

Figure 2:
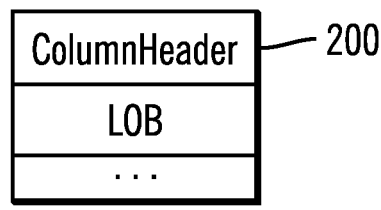
FIG. 2 illustrates, in a block diagram, a database table in accordance with certain embodiments.

FIG. 2 illustrates, in a block diagram, a database table 200 in accordance with certain embodiments. The database table 200 includes a column for a Binary Large Object (BLOB), which is a type of LOB. The term Binary Large Object (BLOB) is used to describe a collection of binary data stored as a single entity in a DBMS. The ellipses in FIG. 2 indicate that there may be other rows of data. In addition, there may be additional columns.

Figure 3:
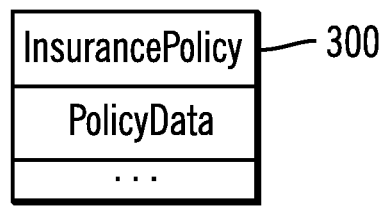
FIG. 3 illustrates, in a block diagram, a database table for storing insurance data in accordance with certain embodiments.
Figure 4:
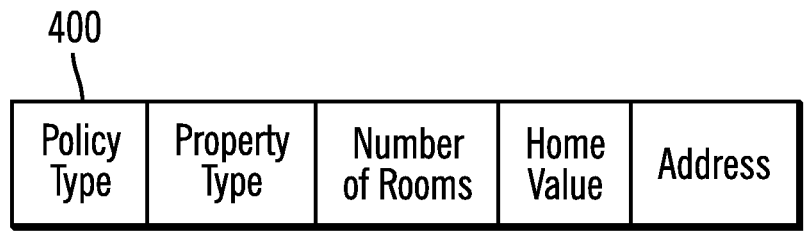
FIG. 4 illustrates, in a block diagram, a structure of LOB data for a home owners insurance policy in accordance with certain embodiments.
Figure 5:
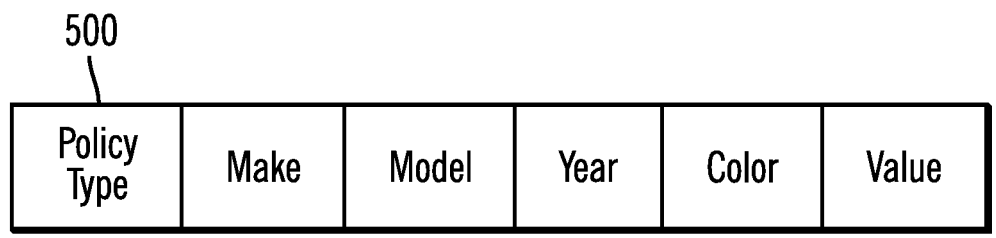
FIG. 5 illustrates, in a block diagram, a structure of LOB data for a motor vehicle insurance policy in accordance with certain embodiments.

FIG. 3 illustrates, in a block diagram, a database table 300 for storing insurance data in accordance with certain embodiments. The database table 300 is for an insurance policy and stores policy data (named "PolicyData" in FIG. 3) as LOB data or as BLOB data. The policy data can store data for either a motor vehicle insurance policy or a home owners insurance policy. The policy data stores one of two different structures (i.e., layouts or formats) depending on the policy type. FIG. 4 illustrates, in a block diagram, a structure 400 of LOB data for a home owners insurance policy in accordance with certain embodiments. The structure 400 includes columns for policy type, property type, number of rooms, home value, and address. FIG. 5 illustrates, in a block diagram, a structure 500 of LOB data for a motor vehicle insurance policy in accordance with certain embodiments. The structure 500 includes columns for policy type, make, model, year, color, and value.

Because each row stored in the database table 300 can be one of two structures 400, 500, the structured LOB system 120 stores structural metadata 140 describing each of the structures associated with the LOB data to assist in processing the LOB data. The structural metadata 140 describes a mapping between LOB data and a particular structure (e.g., structure 400 or 500) to enable mapping the LOB data to the columns for that particular structure.

In addition to storing structural metadata 140 about the structures for the LOB data, the structured LOB system 120 stores, for each row inserted into the database 150, control data (e.g., a control flag or a control field). This control data may be stored directly in the LOB data or as a separate column outside of the LOB data. In FIGS. 4 and 5, the policy type is stored in the first part of the structured LOB data, and the policy type is control data that is used to indicate which type of policy the LOB data is for. This information is used by the structured LOB system 120 to determine how to effectively deliver the LOB data based on the corresponding structure. In particular, the structured LOB system 120 uses the structural metadata 140 to map the LOB data to a particular structure based on the control data.

The following is a sample Query 1:

SELECT*FROM InsurancePolicy

Figure 6:
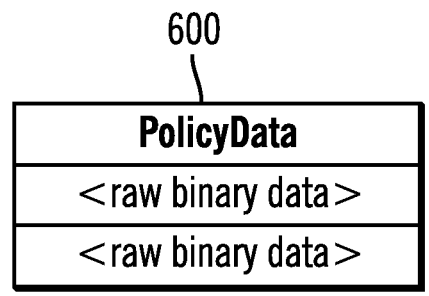
FIG. 6 illustrates, in a block diagram, a result set that shows un-interpreted (raw) binary data in accordance with certain embodiments.

When issuing Query 1, a result set may be returned (e.g., to an end user) containing the PolicyData BLOB as raw binary data. Query 1 may use an index. FIG. 6 illustrates, in a block diagram, a result set 600 that shows un-interpreted (raw) binary data in accordance with certain embodiments. In such cases, an index outside of the BLOB is used. Since result set 600 only contains BLOB data, the BLOB is indexed as a whole. In such cases, an application resolves the BLOB into sub-fields.

When a request is received for the LOB data stored in a column of a database table 160, the structured LOB system 120 uses the structural metadata 140 to generate queries to retrieve the LOB data and insert the LOB data into a result set, which is another database table 160. For example, the structured LOB system uses the structural metadata 140 to generate Query 2, Query 3, Query 4, Query 6, Query 7, and Query 8 below.

The following is a sample Query 2 that identifies a policy type:

SELECT NumberOfRooms FROM INSURANCE-POLICY WHERE POLICYTYPE='H'

The combination of structural metadata 140 and control data allows the structured LOB system 120 to provide end users with structured LOB data. In certain embodiments, the structured LOB system 120 generates a result set having columns of the format of each type of LOB data that may be included in the result set. In certain embodiments, the structured LOB system 120 uses the value of the control data (e.g., the value of the policy type in FIGS. 4 and 5) to determine which columns in the result set may have data) and which may not for each row.

FIG. 7 illustrates, in a block diagram, an insurance policy result set 700 having a format based on formats of underlying LOB data in accordance with certain embodiments. For instance, the structured LOB system 120 provides additional column information in the result set 700, including: policy type, property type, number of rooms, home value, address, make, model, year, color, and value. FIG. 7 shows the result set 700 containing one row of motor vehicle insurance policy data and one row of home owners insurance policy data. Within the result set 700, when the LOB data has control data (i.e., policy type) of value "M", the structured LOB system 120 presents the column data for the motor vehicle insurance policy based on the structural metadata 140 stored in the DBMS 110, which includes: policy type, make, model, year, color, and value. Likewise, when the LOB data has control data of value "H", the structured LOB system 120 presents the column data for the home owners insurance policy based on the structural metadata 140 stored in the DBMS 110, which includes: policy type, property type, number of rooms, home value, and address.

When the structured LOB system 120 presents the values for one type of LOB data (e.g., the motor insurance policy) in a row of the result set, the structured LOB system 120 fills in the values for the columns specific to that type of LOB data, and the structured LOB system 120 presents the columns specific to other types of LOB data (e.g., the home owners insurance policy) as null or not valid for the current row of data.

With the structured LOB system 110, the DBMS 110 has the ability to processes finitely structured LOB data directly. This makes LOB data processing transparent to the end user and provides an extensible mechanism for accessing pieces of data within the structured LOB data, including reading from, inserting into, updating, and indexing finitely structured LOB data.

The following is a sample Query 3 for inserting values for a home owners insurance policy:

INSERT INTO INSURANCEPOLICY (PolicyType,
        PropertyType, NumberOfRooms, HomeValue,
        ADDRESS) VALUES('H', 'SINGLE FAMILY',
        '5', '500000', '555 BAILEY AVE')

The following is a sample Query 4 for inserting values for a motor vehicle insurance policy:

INSERT INTO INSURANCEPOLICY (PolicyType,
        MAKE, MODEL, YEAR, COLOR, VALUE)
        VALUES('M', 'FORD', 'T', '1966', 'BLACK',
        '15000')

FIG. 8 illustrates, in a flow diagram, operations for processing structured content within Large Object (LOB) data that is stored in a column of a database table 160 in accordance with certain embodiments. Control begins at block 800 with the structured LOB system 120 storing structural metadata 140 describing (two or more) structures that each define a different format of the structured content. In certain embodiments, a database administrator/creator merges information describing (two or more) structures of the LOB data into the structural metadata 140. In block 802, the structured LOB system 120 receives a request for data in a database table 160. The LOB data is stored in a column of the database table 160, for at least one of the rows of data in the database table 160. In block 804, the structured LOB system 120 uses the structural metadata 140 to create an empty result set with columns defined by at least two structures. In certain embodiments, the structured LOB system 120 does not repeat redundant columns (e.g., the policy type column is in both structures 400 and 500, but result set 700 shows the policy type column once). In certain embodiments, the structured LOB system 120 restricts field names of a given table to be unique. Therefore, if multiple LOB structures are defined, such as "Home Insurance", "Car Insurance", and "Life Insurance", and if the three types share a common field, such as "address", the database definition would have a field with NAME="HOME_ADDRESS", a field with NAME="CAR_ADDRESS", and a field with NAME="LIFE_ADDRESS".

Figure 8A:
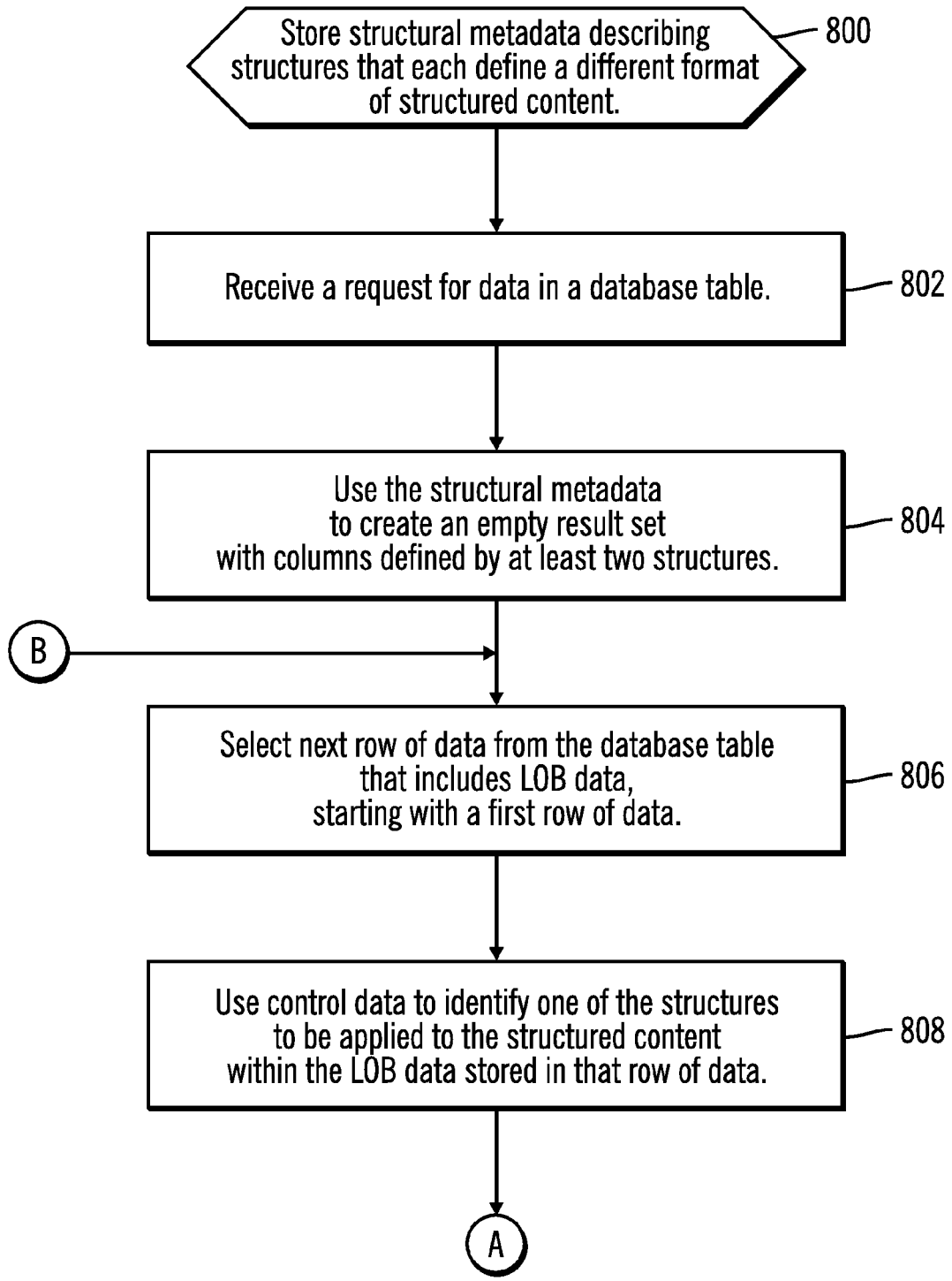
FIG. 8 illustrates, in a flow diagram, operations for processing structured content within Large Object (LOB) data that is stored in a column of a database table in accordance with certain embodiments.
Figure 8B:
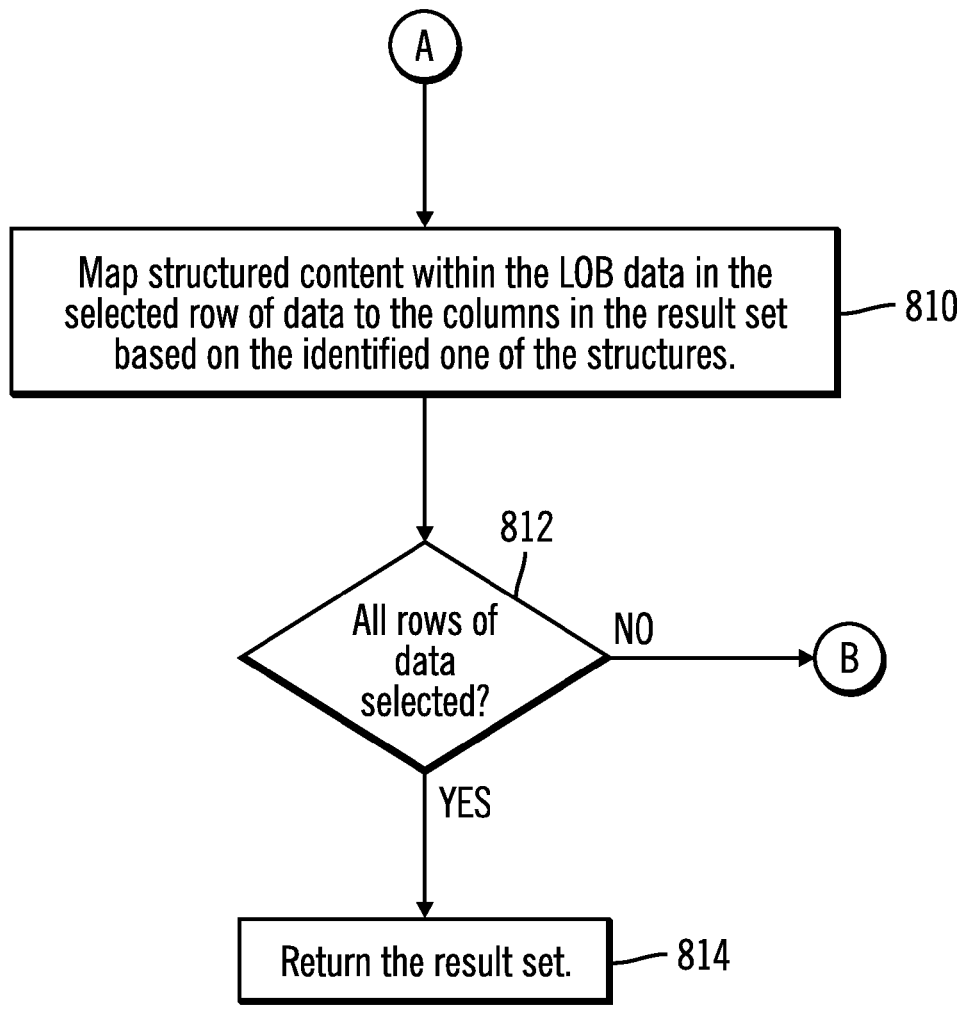

In block 806, the structured LOB system 120 selects a next row of data from a database table 160 that includes LOB data, starting with a first row of data. In block 808, the structured LOB system 120 uses control data to identify one of the structures to be applied to the structured content within the LOB data stored in that row of data. From block 808, processing continues to block 810 (FIG. 8B).

In block 810, the structured LOB system 120 maps the structured content within the LOB data in that row of data to the columns in the result set based on the identified one of the structures. In certain embodiments, the mapping is done by creating queries. For example, the structured LOB system 120 creates a first query using the structural metadata 140 to retrieve a field value from the structured content and creates a second query using the structural metadata 140 to insert the field value into a column of the result set.

In block 812 the structured LOB system 120 determines whether all rows of data have been selected. If so, processing continues to block 814, otherwise, processing loops back to block 806 to select another row of data (FIG. 8A).

In block 814, the structured LOB system 120 returns the result set. The structured content within the LOB data is presented in columns of the result set.

FIG. 9 illustrates pseudocode 900 describing an insurance policy table in accordance with certain embodiments. A "PolicyType" field is meant to act as control data in the form of a control field in the PolicyData mapping. This is defined by using a DEPENDINGON=parameter of a DFSMAP statement. Each DFSMAP statements contains one or more DFSCASE statements that represent one of the 1:N values of the control field PolicyType. In this example, there are two cases, HOUSE and MOTOR. The CASEID=is the value expected to be stored within the PolicyType field. When a query inspects the value for PolicyType, the appropriate DFSCASE definition is used to determine the FIELD structure for that record. In this example, the LOB data is defined by the DFSMAP and spans from offset 2 through 46. For the insurance policy table, the structural metadata 1000, 1010 defines PolicyType as the DFSMAP's control field (DEPEDINGON). The DFSCASE metadata then tells the structured LOB system 120 how to interpret the various rows in a table by providing the CASEID (control data value) that corresponds to specific LOB data.

FIGS. 10A and 10B illustrates an example of structural metadata 1000, 1010 for the pseudocode 900 for the insurance policy table in accordance with certain embodiments. The metadata representation may be consumed by a tool (e.g., third party software that utilizes the DBMS 110 to understand the table.

The user may query the structural metadata 140 in the catalog 130 to identify which records are for which policy type.

Thus, embodiments simplify the interaction and interpretation of LOB data in cases in which the LOB data has a finite number of structured structures. Embodiments store and query variable data whose structure can vary from one record to the next. Embodiments manage multiple, different record types in a single table, using structured LOB data.

The structural metadata 140 allows Database Administrators (DBAs) or others to define a layered and flexible structure for LOB data. Layered may be described as deeply nested fields. With a nested field, LOB data may contain a field that itself contains other LOB data. Flexible may be described as having no constraint on data types within these layers, even user defined types (which do not need to be made up of pre-existing DBMS types) can be introduced. Given this structural metadata 140, embodiments apply structure to previously unstructured, raw LOB data and offer the capability to leverage a database query language (e.g., SQL) to read and write into these LOB fields, no matter how deeply nested.

Certain embodiments process the varied structures stored within the LOB column of a database. Structural metadata describing the varied structures used within the LOB data is stored. When a request for the LOB data is received, the structural metadata associated with the LOB data is used to define a query that can map into the LOB data. For each row of data for which the LOB data is returned, control data is used to identify which of the underlying, varied structures applies to that LOB data, and the LOB data is mapped to the columns in the corresponding result set.

Accessing Structured Content

With embodiments, the structured LOB system 120 offers the ability to natively search and index specific fields in the structured content, where these fields are at a known offset in the LOB data. The structured LOB system 120 allows indexing capability on these fields for retrieval of LOB data using an index 162.

The structured LOB system 120 offers the ability for a DBMS 110 to dynamically search or index structured content within the LOB data without needing to materialize the LOB data or portions of the LOB data. The structured content in the LOB data is at a known location (i.e., offset) within the LOB data. The structured LOB system 120 also offers the ability for a DBMS 110 to create indexes on these structured fields of the LOB data for retrieval of the entire LOB data, without the DBMS 110 having to extract and duplicate the target data from the LOB data and store the target data in another column when the LOB data is first inserted and without the DBMS having to materialize portions of the LOB data. The DBMS 110 may directly access any portion or subset of the LOB data, regardless of whether or not the LOB data contains structured content. The DBMS 110 does not need to know ahead of time that the LOB data has structured fields. The searching of the LOB data is done dynamically, on an as-needed basis. Thus, no additional database metadata needs to be defined to the DBMS 110. With embodiments, the structured LOB system 120 searches on a subset of LOB data that has been stored (e.g., for decades).

The structured LOB system 120 offers application programs the ability to author queries with search predicates that qualify on any subset of LOB data. For example, the query can search for each LOB data that contains a specific 'artist' name in a tag contained within that LOB data. Application programs can also choose to retrieve only the 'artist' information from the LOB data. The structured LOB system 120 extracts this information directly from the LOB data, without needing to materialize the LOB data internally in order to extract the information.

Embodiments are applicable to any type of data where there is a consistent way of measuring offset and length (e.g., binary data).

The structured LOB system 120 searches for or retrieves data based on the name of a column within a table 160. This allows any subset of columns or a tuple to be searched by the structured LOB system 120. In turn, this allows structured content within a column to be searched without needing to first materialize the content of the column to look for a data value.

Figure 11:
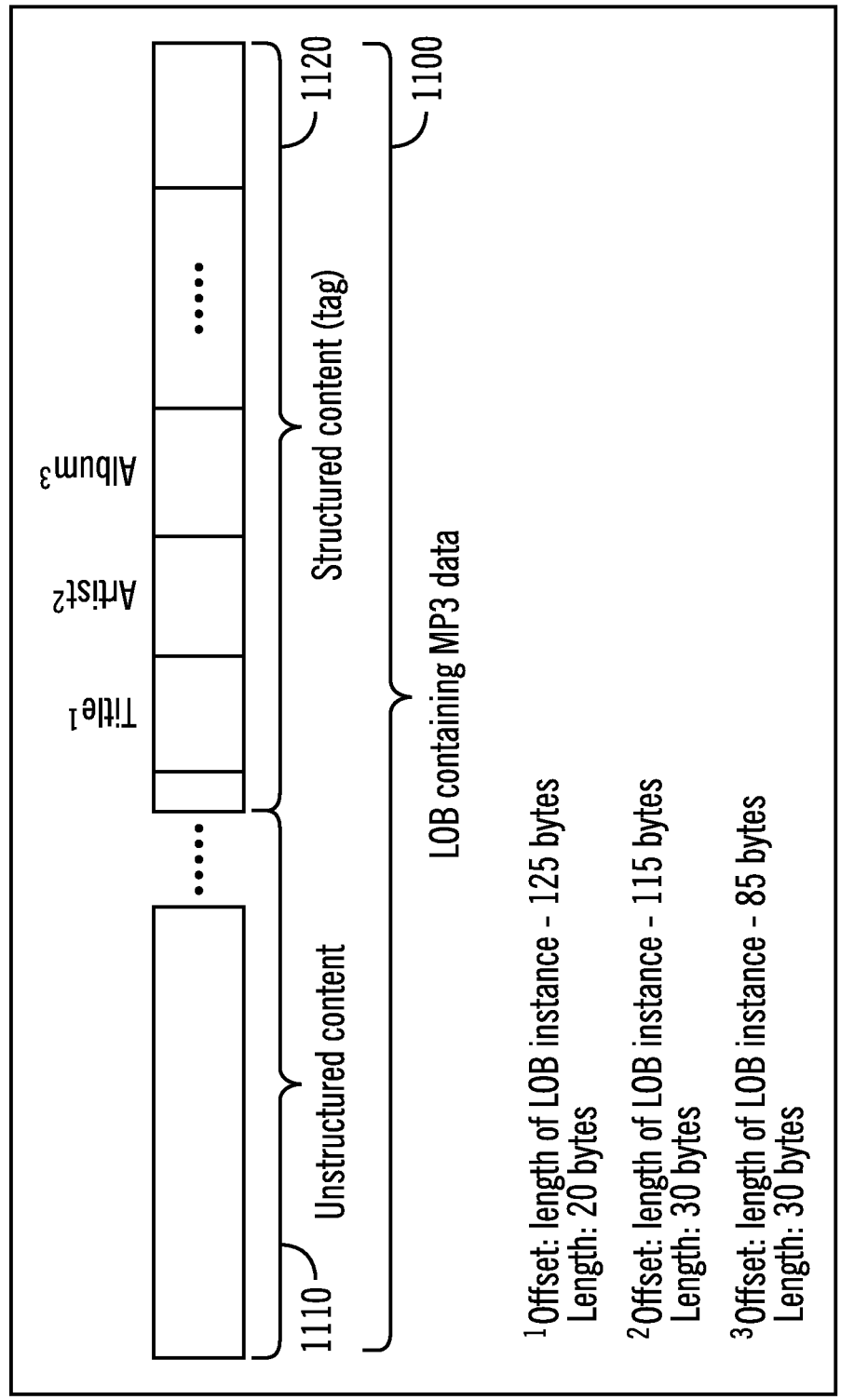
FIG. 11 illustrates, in a block diagram, structured content within LOB data in accordance with certain embodiments.

FIG. 11 illustrates, in a block diagram, structured content within LOB data in accordance with certain embodiments. In FIG. 11, there is LOB data 1100 containing MP3 data. The LOB data 1100 includes unstructured content 1110 and structured content 1120. The title, artist, and album data are at known offsets and can be searched for or retrieved by the structured LOB system 120.

Figure 12:
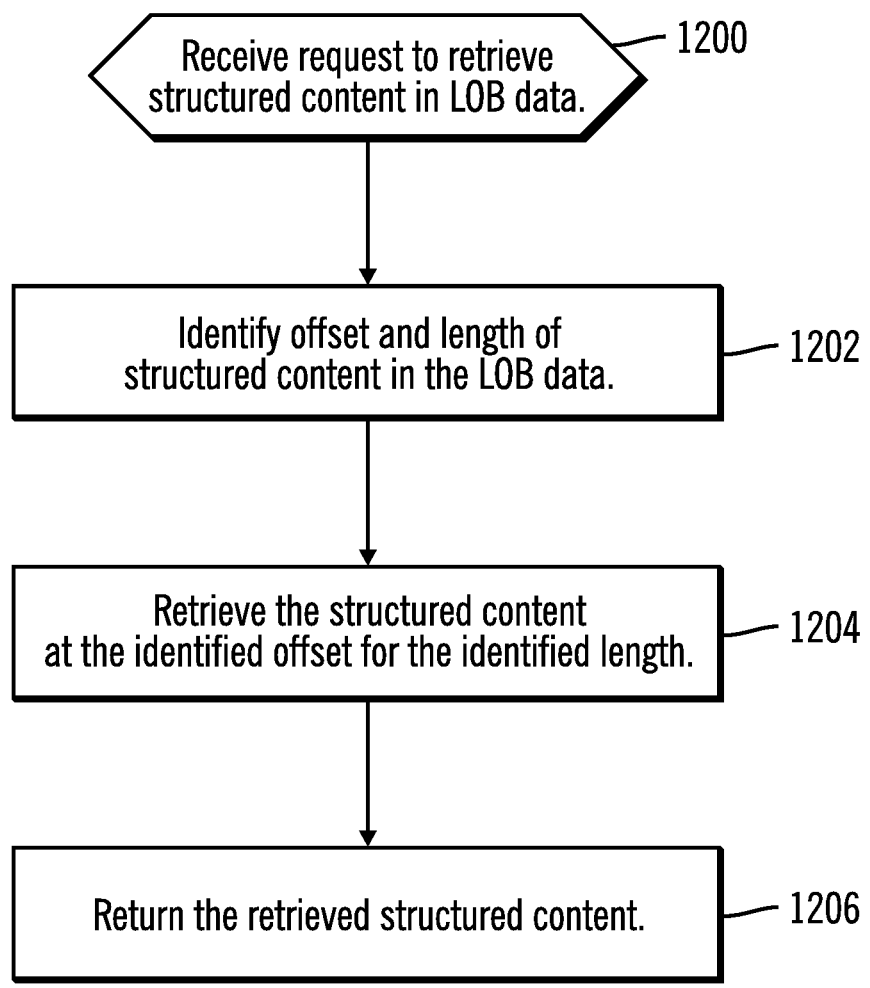
FIG. 12 illustrates, in a flow diagram, operations for retrieving structured content in LOB data in accordance with certain embodiments.

FIG. 12 illustrates, in a flow diagram, operations for retrieving structured content in LOB data in accordance with certain embodiments. Control begins at block 1200 with the structured LOB system 120 receiving a request for structured content in the LOB data. The request may be in the form of a query based on fields of the structured content. In block 1202, the structured LOB system 120 identifying an offset and a length of the structured content in the LOB data. In certain embodiments, provided the column name, the structured LOB system 120 resolves that to an offset and a length within a buffer containing the data representing that column. In certain embodiments, the structured LOB system 120 allows the offset and the length to be provided, in addition to, or even instead of, the column name. The offset may be relative to the start of the table 160 or to the start of the column within the table 160. In block 1204, the structured LOB system 120 retrieves the structured content at the identified offset for the identified length. The structured LOB system 120 goes to the column in the table storing the LOB data and searches for the structured content based on the query. In block 1206, the structured LOB system 120 returns the retrieved structured content.

Figure 13:
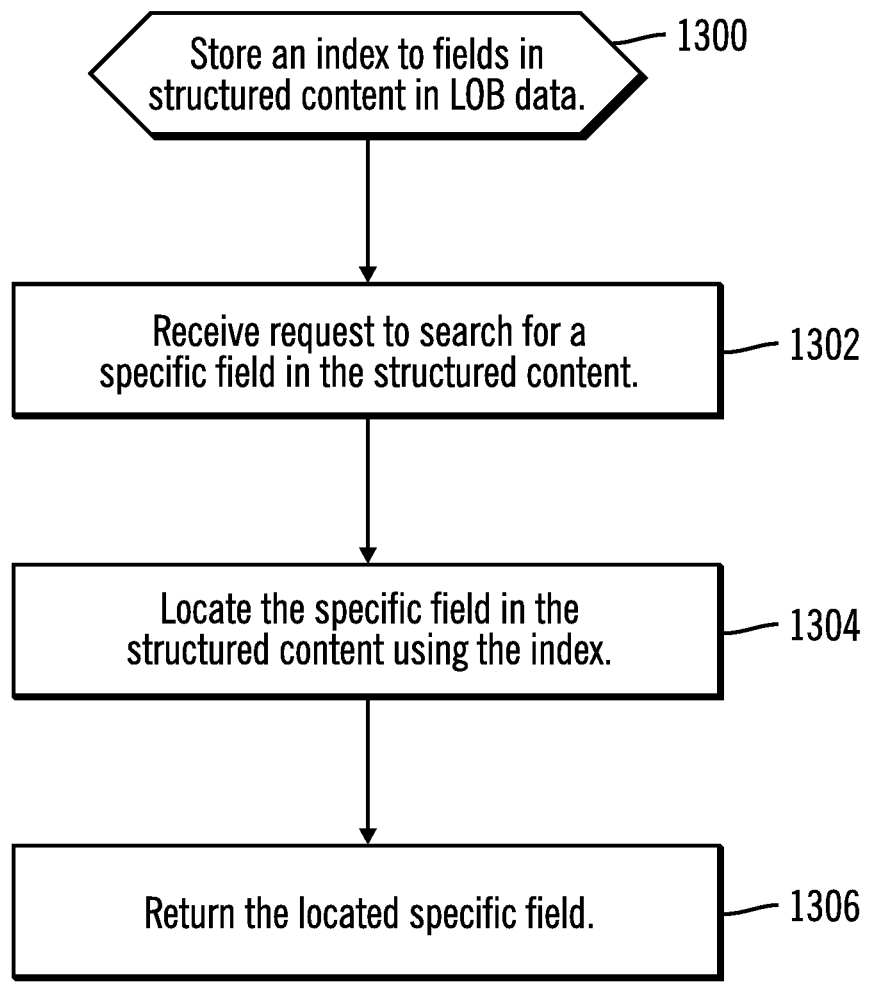
FIG. 13 illustrates, in a flow diagram, operations for indexing and searching for structured content in LOB data in accordance with certain embodiments.

FIG. 13 illustrates, in a flow diagram, operations for indexing and searching for structured content in LOB data in accordance with certain embodiments. Control begins at block 1300 with the structured LOB system 120 storing an index 162 for fields in structured content in LOB data. In block 1302, the structured LOB system 120 receives a request to search for a specific field in the structured content. The request may be in the form of a query based on a field (i.e., column) identifying the specific field of the structured content or may be in the form of an offset and length identifying the specific field. In block 1304, the structured LOB system 120 locates the specific field in the structured content using the index 162. In block 1306, the structured LOB system 120 returns the located specific field.

In certain embodiments, the structured content is indexed on offset and length, which is provided by the structural metadata 140 within the catalog 130.

Embodiments provide the ability to index and search fields in LOB data without needing to first materialize the LOB data looking for the fields. The structured LOB system 120 provides direct access to the fields.

In certain embodiments, the structured LOB system 120 allows the offset and length to be provided, in addition to, or even instead of, the column name. The offset may be relative to the start of the table 160 or to the start of the column within the table 160. The following is a sample Query 5 providing the offset and length:

```
SELECT*from myTable WHERE offset:20;length:
    30='someValue'
```

A user may retrieve or update a specific field in the LOB data. The following sample Query 6, Query 7, and Query 8 access structured content with known "column names" for the fields within the structured content:

```
SELECT NumberOfRooms FROM INSURANCE-
    POLICY

SELECT NumberOfRooms FROM INSURANCE-
    POLICY WHERE POLICYTYPE='H'

UPDATE INSURANCEPOLICY SET
    NumberOfRooms='10'WHERE
    POLICYTYPE='H'
```

With embodiments, the unstructured LOB data has a subset of data that is structured (e.g., tagging for multimedia where the tagging portion is part of the LOB data but has structured information inside of it). Embodiments search a subset of this single column without needing to start at the beginning and materialize the column up to the point where the information resides. Also, on insert of this column, the DBMS 110 does not need to extract that section of the information and store it redundantly elsewhere for query capability.

Granular Nullability in Variable Length Binary Data with Structured Content

Embodiments null out dynamic content that exist at the end of a VLOB record and that do not fit within the physical space allocated to the VLOB record. Embodiments maintain a length field (i.e., a size field) of a VLOB record, and the structured LOB system 120 nulls any fields that are mapped in an area outside of the length of the given VLOB record. In certain embodiments, the length field is defined at the beginning of the VLOB and identifies the actual size of the VLOB record. From this length value, the structured LOB system 120 knows, based on the structural metadata 140, which of the nested (or inner) fields of that VLOB record are invalid because they lie beyond the physical size allocated to the VLOB record.

A VLOB can have multiple fields mapped within its maximum possible length. In the record in which the VLOB record is smaller than the maximum possible length of the VLOB, there will be mapped fields at the end of the VLOB metadata that lie outside of the VLOB record data, thereby making them non-existent fields.

The structured LOB system 120 provides a granular level of nullability within a VLOB's structured content. With embodiments, the specific fields in the metadata that do not exist for a given VLOB record marked null, and the remaining fields remain valid and can be retrieved directly by the structured LOB system 120. The structured LOB system 120 is able to interpret any valid structured content from a VLOB.

Figure 14:
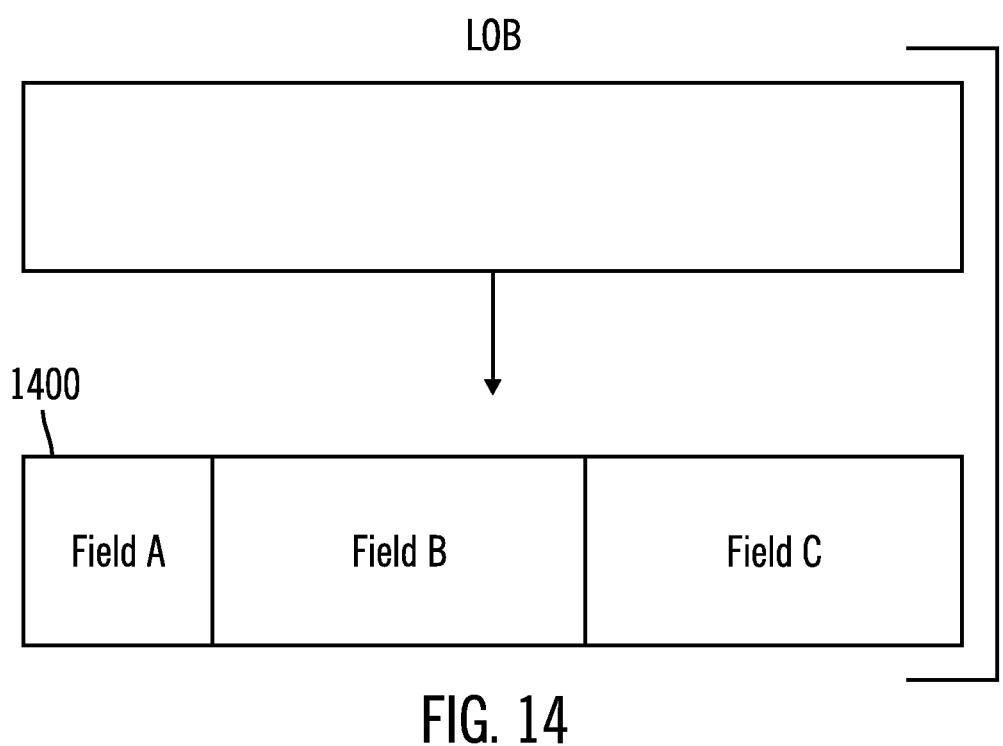
FIG. 14 illustrates, in a block diagram, fixed-length LOB data in accordance with certain embodiments.

FIG. 14 illustrates, in a block diagram, fixed-length LOB data 1400 in accordance with certain embodiments. When structured content is applied to the LOB data 1400, the LOB data 1400 can be interpreted by the LOB system 120 as three distinct fields: Field A, Field B, and Field C. In the case in which a VLOB, whose length can vary from record to record, the fields for the VLOB may be longer than the length for those fields and, thus, may fall outside of a particular VLOB record. In such a case, if a field defined in the structural metadata 140 for a VLOB extends beyond the length of a specific VLOB record, then the structured LOB system 120 considers that field to be invalid (or null). In particular, in such a case, the physical storage area of the field is non-existent (i.e., the VLOB has more fields than fit into the physical space assigned to the VLOB record).

Figure 15:
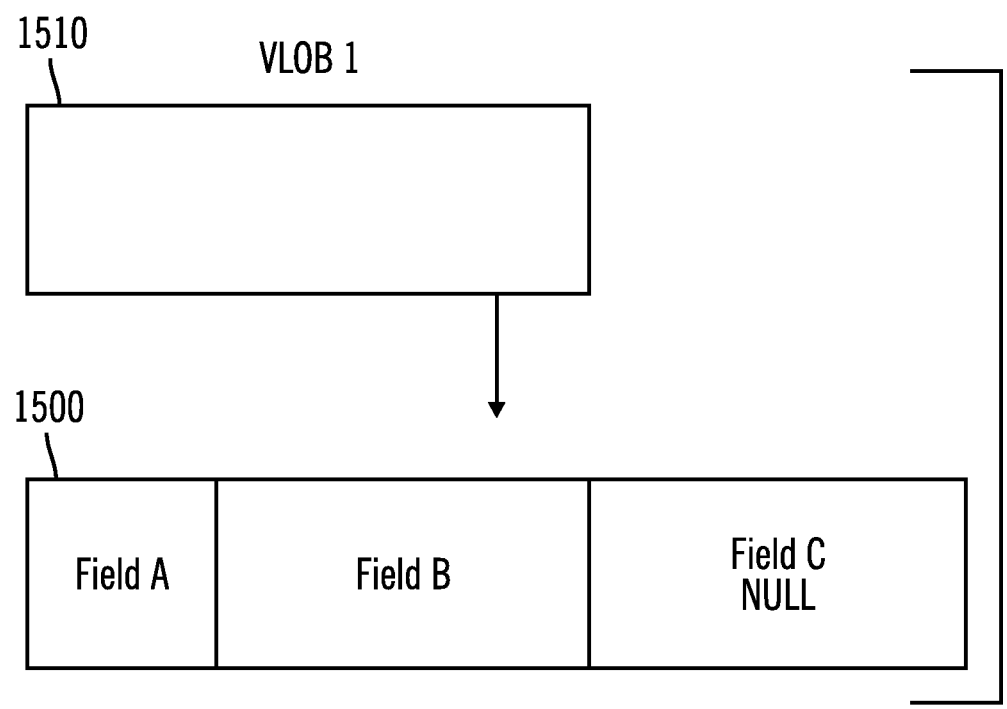
FIG. 15 illustrates, in a block diagram, VLOB data with one null field in accordance with certain embodiments.
Figure 16:
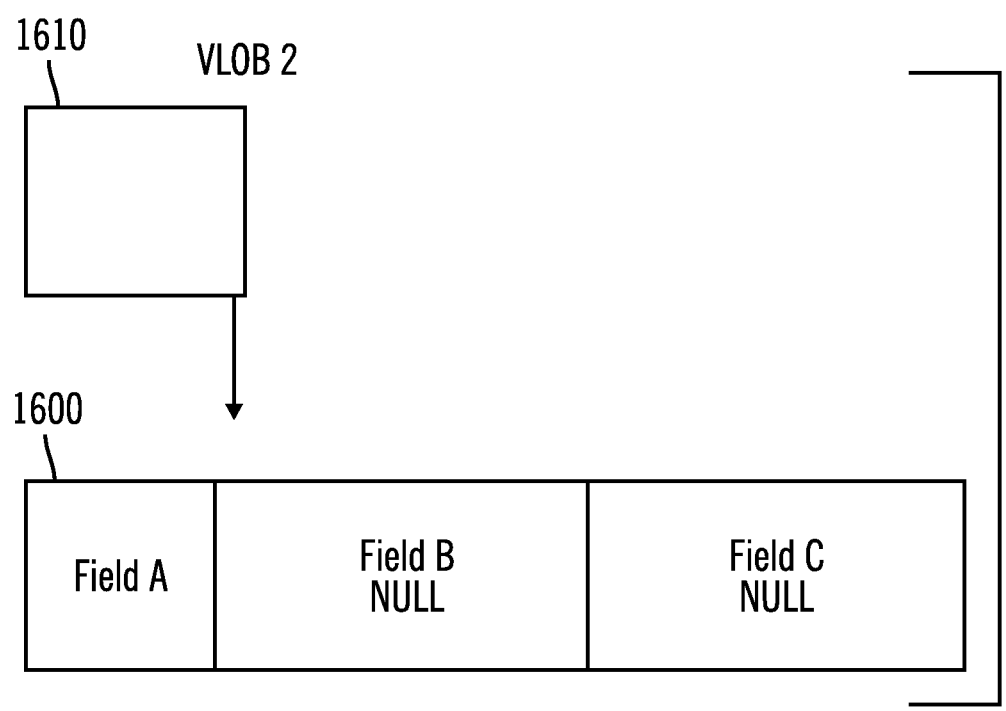
FIG. 16 illustrates, in a block diagram, VLOB data with multiple null fields in accordance with certain embodiments.

FIG. 15 illustrates, in a block diagram, a VLOB 1500 with one null field in accordance with certain embodiments. In FIG. 15, a VLOB1 record 1510 is a record of the VLOB 1500 whose length contains Field A and Field B. In VLOB1 record 1510, Field C, which falls outside of the length of VLOB1 record 1510, is treated as null. FIG. 16 illustrates, in a block diagram, a VLOB 1600 with multiple null fields in accordance with certain embodiments. In FIG. 16, a VLOB2 record 1610 is a record of the VLOB 1600 whose length contains Field A. Field B and Field C, which fall outside of the length of VLOB2 record 1610, are treated as null.

Assuming a structured VLOB is defined to consist of four fields: F1, F2, F3, F4, and each field is defined to have a length of 10 bytes. Then, if a VLOB of 30 bytes is inserted, the structured LOB system 120 determines that field F4 is null. Similarly, if a VLOB of 20 bytes is inserted, the structured LOB system 120 determines that field F3 and field F4 are null.

As another example, if a VLOB has fields F1, F2, F3, F4, and F5, and a length field is defined for the VLOB that only covers up to field F1, then the structured LOB system 120 nulls fields F2, F3, F4, and F5. Separately, if F1 is already null (i.e., is a nullable field that has no data), then, field F1 continues to be treated as null.

The users may qualify queries based on whether a field defined in a VLOB is valid or invalid. The structured LOB system 120 looks at the length of a particular VLOB record to see whether the field is within the VLOB's area to determine whether the field exists in the physical database.

For example, the following is a sample Query 9:

SELECT B FROM TBL WHERE B ISNOTNULL

The structured LOB system 120 processes Query 9 by performing a lookup for records where the VLOB is of length big enough to contain field B. In this manner, embodiments provide a solution for handling the nullability of structured content within a VLOB in a granular way. Also, embodiments allow the database query language to qualify on whether the nested fields in a VLOB are null or not null.

Figure 17:
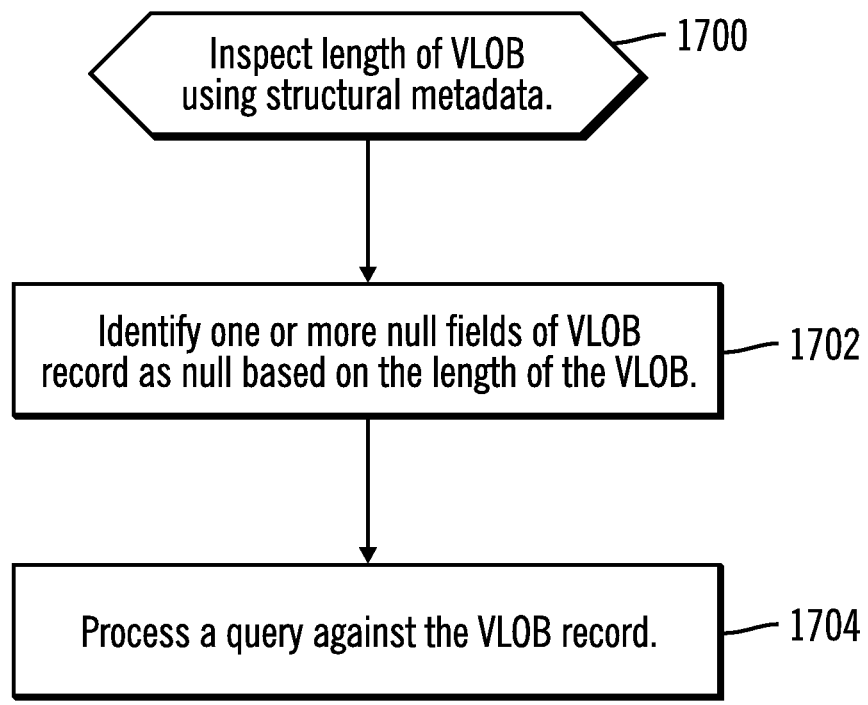
FIG. 17 illustrates, in a flow diagram, operations for processing a VLOB in accordance with certain embodiments.

FIG. 17 illustrates, in a flow diagram, operations for processing a VLOB in accordance with certain embodiments. Control begins at block 1700 with the structured LOB system 120 inspects the length of a VLOB using the structural metadata 140. In block 1702, the structured LOB system 120 identifies one or more null fields of a VLOB record as null based on the length of the VLOB. In block 1704, the structured LOB system 120 processes a query against the VLOB record.

Figure 18:
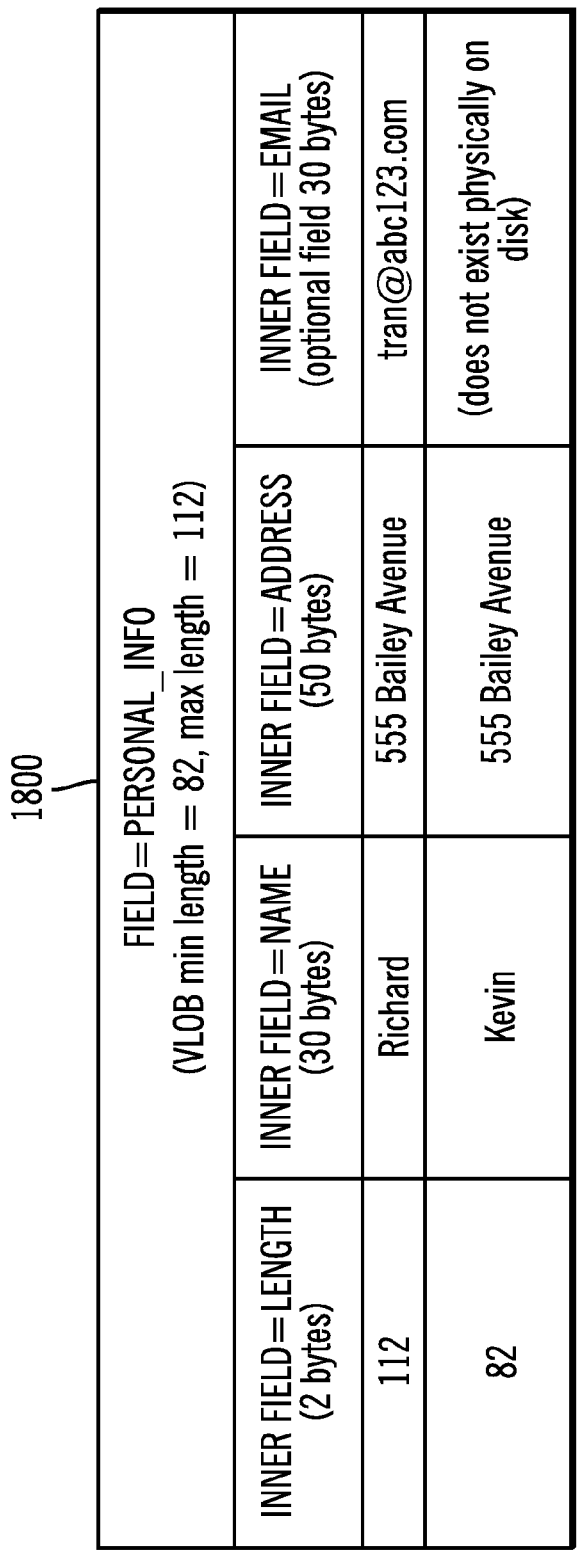
FIG. 18 illustrates, in a block diagram, a table in accordance with certain embodiments.

FIG. 18 illustrates, in a block diagram, a table 1800 in accordance with certain embodiments. In FIG. 18, there is a VLOB that contains the length of the VLOB record, and the inner fields NAME, ADDRESS, and EMAIL. Based on the defined minimum and maximum length of the VLOB, it can be seen that the inner field EMAIL lies in the variable section of the VLOB. In the first record for RICHARD, it can be seen that the length 112 defines the full VLOB record, making email a valid field. In the second record for KEVIN, the length 82 does cover the area that EMAIL is defined for, thereby making the field EMAIL null.

FIG. 19 illustrates a definition of a VLOB in accordance with certain embodiments. In particular, FIG. 19 shows how the VLOB structure from FIG. 18 is defined in the database 150.

The structured LOB system 120 is sensitive to CREATE, READ and UPDATE operations issued against a VLOB. For each of these operations, the structured LOB system 120 either inspects and/or updates the value of the length field of the VLOB record. The DELETE operation remains unchanged as that would just delete the entire VLOB record.

For a CREATE (INSERT) operation, the structured LOB system 120 determines the last field defined by the INSERT statement in the VLOB and sets the length field to the appropriate value to contain that field. For example, based on the metadata in FIG. 18, to insert the first record of FIG. 18, the user can issue the following sample Query 10:

INSERT INTO PERSONAL_INFO (NAME,
    ADDRESS, EMAIL) VALUES ('RICHARD',
    '555 Bailey Ave', 'tran@abc123.com')

The structured LOB system 120 determines that EMAIL is the last field being inserted and that the length size needed to contain the field EMAIL is 112 bytes. Then, the structured LOB system 120 inserts a LENGTH value of 112.

To insert the second record if FIG. 18, the user can issue the following sample Query 11:

INSERT INTO PERSONAL_INFO (NAME,
    ADDRESS) VALUES ('KEVIN', '555 Bailey
    Ave')

The structured LOB system 120 determines that ADDRESS is the last field being inserted and that the length size needed to contain the field ADDRESS is 82 bytes. Then, the structured LOB system 120 inserts a LENGTH value of 82.

For an UPDATE operation, the structured LOB system 120 determines the last updated field defined by the UPDATE statement and grows the length of the VLOB record to accommodate the newer size, as needed. If the VLOB record already has a length that can accommodate the updated field, then no change is made to the length field. This prevents unwanted truncation of the VLOB record size and accidental nullification of valid data.

For a READ (SELECT) operation, the structured LOB system 120 checks the size of the length field and determines whether the fields being retrieved fall within the defined length of the VLOB record. For the fields that are outside the length of the VLOB record, a value of null is returned.

The following is an example Query 12:

SELECT EMAIL FROM PERSONAL_INFO
WHERE EMAIL ISNULL

The structured LOB system 120 internally realizes that EMAIL is part of a VLOB and converts query 12 to an equivalent Query 13 that can be easily processed:

SELECT LENGTH FROM PERSONAL_INFO
WHERE LENGTH<112

This provides a solution for the structured LOB system 120 to handle the nullability of structured content within a VLOB in a granular way as well as a way for the Data Query Language to qualify on whether the nested fields in a VLOB is null or not null.

Embodiments rely on the structural metadata 140 to provide structure to a VLOB column. There are no null indicators present for the structured fields in the VLOB, instead there is a single length field at the head of the VLOB that indicates the overall length of the VLOB record. Embodiments provide the ability for the structured LOB system 120 to detect that areas in a VLOB are not present and, therefore, represent them as null entities. Internally, the structured LOB system 120 manages this length field and updates the length field appropriately when VLOB records are inserted or updated via the database query language.

With embodiments, the VLOB is broken up into well defined fields, and the structured LOB system 120 applies the concept of nullability correctly to those fields based on whether they exist or not, which is based on the length of the VLOB.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 20:
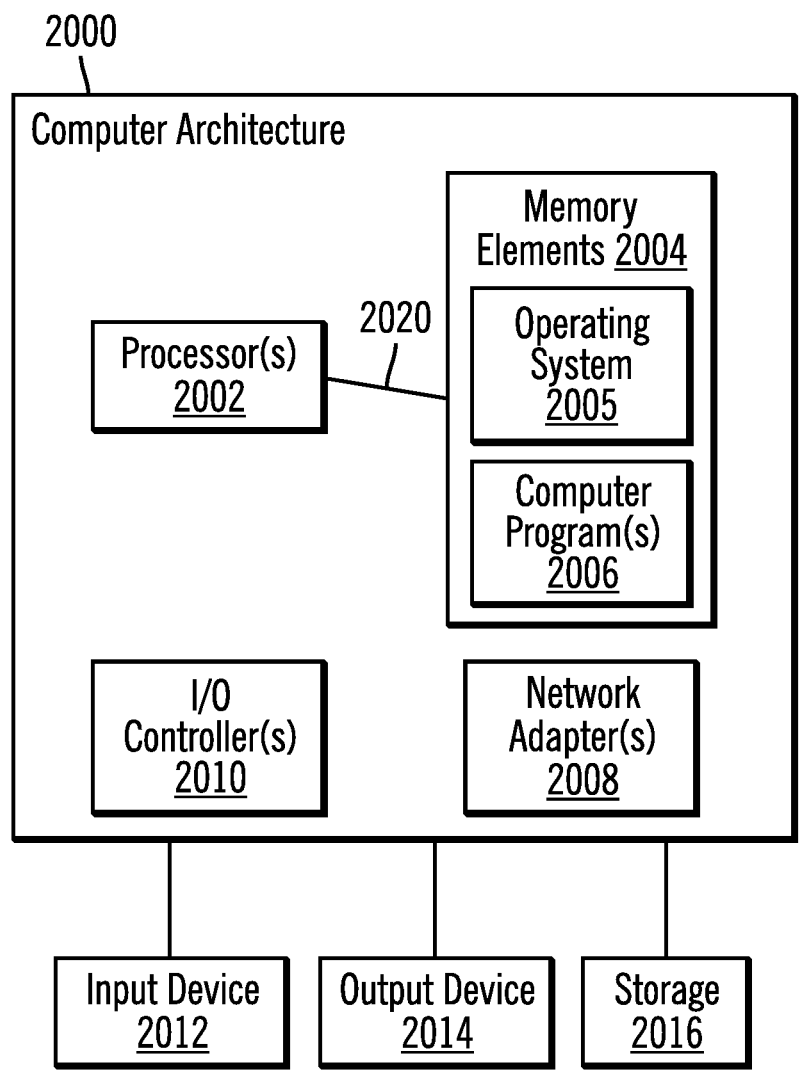
FIG. 20 illustrates, in a block diagram, a computer architecture that may be used in accordance with certain embodiments.

FIG. 20 illustrates a computer architecture 2000 that may be used in accordance with certain embodiments. Computing device 100 may implement computer architecture 2000. The computer architecture 2000 is suitable for storing and/or executing program code and includes at least one processor 2002 coupled directly or indirectly to memory elements 2004 through a system bus 2020. The memory elements 2004 may include local memory employed during actual execution of the program code, bulk storage, and cache memories which provide temporary storage of at least some program code in order to reduce the number of times code must be retrieved from bulk storage during execution. The memory elements 2004 include an operating system 2005 and one or more computer programs 2006.

Input/Output (I/O) devices 2012, 2014 (including but not limited to keyboards, displays, pointing devices, etc.) may be coupled to the system either directly or through intervening I/O controllers 2010.

Network adapters 2008 may also be coupled to the system to enable the data processing system to become coupled to other data processing systems or remote printers or storage devices through intervening private or public networks. Modems, cable modem and Ethernet cards are just a few of the currently available types of network adapters 2008.

The computer architecture 2000 may be coupled to storage 2016 (e.g., any type of storage device; a non-volatile storage area, such as magnetic disk drives, optical disk drives, a tape drive, etc.). The storage 2016 may comprise an internal storage device or an attached or network accessible storage. Computer programs 2006 in storage 2016 may be loaded into the memory elements 2004 and executed by a processor 2002 in a manner known in the art.

The computer architecture 2000 may include fewer components than illustrated, additional components not illustrated herein, or some combination of the components illustrated and additional components. The computer architecture 2000 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   storing, using a processor of a computer, structural metadata describing a first structure and a second structure that each define a different format of structured content, wherein the structured content is a subset of Large Object (LOB) data, wherein the first structure has a first set of columns, and wherein the second structure has a second set of columns;
   using the structural metadata to create a result set that is empty with the first set of columns and the second set of columns;
   for each row of data in the database table that includes the LOB data,
      in response to control data identifying the LOB data as having the first structure, mapping the structured content within the LOB data in that row of data to the first set of columns in the result set by generating queries using the structural metadata describing the first structure; and
      in response to the control data identifying the LOB data has having the second structure, mapping the structured content within the LOB data in that row of data to the second set of columns in the result set by generating queries using the structure metadata describing the second structure; and
   returning the result set.

2. The method of claim 1, wherein the structured content comprises a field and further comprising:
   in response to receiving the request,
      creating a first query using the structural metadata to retrieve a field value from the structured content; and
      creating a second query using the structural metadata to insert the field value into a column of the result set.

3. The method of claim 1, wherein the structural metadata includes offsets and lengths of structured content in the LOB data.

4. The method of claim 1, wherein the control data is part of the LOB data.

5. The method of claim 1, wherein the control data is stored as a separate column.

6. The method of claim 1, wherein the LOB data includes structured content and unstructured content, and further comprising:
   receiving a request to retrieve the structured content in the LOB data;
   identifying an offset and a length of the structured content in the LOB data;
   retrieving the structured content at the identified offset for the identified length; and
   returning the retrieved structured content.

7. The method of claim 1, wherein the LOB data includes structured content and unstructured content, and further comprising:
   storing an index to elements in the structured content;
   receiving a request to search for a specific element in the structured content in the LOB data;
   locating the specific element in the structured content using the index; and
   returning the located specific element.

8. The method of claim 1, further comprising:
   receiving a Variable length LOB (VLOB) record having multiple fields; and
   in response to determining that a field in the VLOB record extends beyond physical space allocated to the VLOB record, treating the field as null.

9. The method of claim 8, further comprising:
   processing a query that references a null field in the VLOB record.

* * * * *